(12) United States Patent
Guerraz et al.

(10) Patent No.: US 7,518,745 B2
(45) Date of Patent: Apr. 14, 2009

(54) IMAGING SYSTEM WITH HAPTIC INTERFACE

(75) Inventors: Agnès Guerraz, Le Gua (FR); Caroline Privault, Montbonnot-Saint-Martin (FR)

(73) Assignee: Xerox Corporation, Norwalk, CT (US)

( * ) Notice: Subject to any disclaimer, the term of this patent is extended or adjusted under 35 U.S.C. 154(b) by 631 days.

(21) Appl. No.: 11/237,321

(22) Filed: Sep. 28, 2005

(65) Prior Publication Data

US 2007/0070033 A1 Mar. 29, 2007

(51) Int. Cl.
- *H04N 1/40* (2006.01)
- *G06F 3/01* (2006.01)
- *G09G 5/00* (2006.01)
- *G03G 15/00* (2006.01)

(52) U.S. Cl. .............. 358/1.15; 358/448; 715/700; 715/701; 715/702; 345/156; 399/61

(58) Field of Classification Search ............. 399/81–83, 399/85; 715/701, 700, 702; 358/402, 448–449, 358/1.15, 1.9; 382/296–297; 709/217; 455/67.11, 455/423; 379/15.01, 26.02, 265.03, 27.04, 379/29.1, 32.01; 345/156

See application file for complete search history.

(56) References Cited

U.S. PATENT DOCUMENTS

| | | | |
|---|---|---|---|
| 5,576,727 A | 11/1996 | Rosenberg et al. | |
| 5,734,373 A | 3/1998 | Rosenberg et al. | |
| 5,872,569 A | 2/1999 | Salgado et al. | |
| 6,128,006 A | 10/2000 | Rosenberg | |
| 6,147,674 A | 11/2000 | Rosenberg | |
| 6,154,201 A | 11/2000 | Levin | |
| 6,438,574 B1 | 8/2002 | Nagashima | |
| 6,519,429 B2 * | 2/2003 | Muramatsu | 399/82 |
| 6,636,197 B1 | 10/2003 | Goldenberg et al. | |
| 6,686,911 B1 | 2/2004 | Levin et al. | |
| 6,838,851 B2 | 1/2005 | Hayasaka | |
| 6,904,823 B2 | 6/2005 | Levin et al. | |
| 7,120,382 B2 * | 10/2006 | Shimizu et al. | 399/392 |
| 7,221,938 B2 * | 5/2007 | Romeo | 455/423 |
| 2002/0126091 A1 | 9/2002 | Rosenberg et al. | |
| 2003/0115284 A1 * | 6/2003 | Henry | 709/217 |
| 2004/0095369 A1 * | 5/2004 | Takeuchi et al. | 345/701 |
| 2004/0164959 A1 | 8/2004 | Rosenberg et al. | |
| 2004/0257380 A1 | 12/2004 | Herbert et al. | |
| 2005/0138065 A1 | 6/2005 | Ciriza | |
| 2005/0219640 A1 * | 10/2005 | Kasatani | 358/402 |

OTHER PUBLICATIONS

U.S. Appl. No. 60/657,584, filed Mar. 1, 2005, Castellani, et al.

(Continued)

*Primary Examiner*—Edward L Coles
*Assistant Examiner*—Charlotte M Baker
(74) *Attorney, Agent, or Firm*—Fay Sharpe LLP (57) ABSTRACT

An imaging system includes a processing component which receives images to be rendered and a rendering device, such as a marking engine, fax machine or email system, in communication with the processing component for rendering an image supplied by the processing component. A haptic interface is in communication with the processing component for inputting commands from the user to the processing component for rendering the image, and outputting feedback from the processing component to the user as a force feedback.

18 Claims, 4 Drawing Sheets

OTHER PUBLICATIONS

Chappell Brown, *Tactile Engineering Ramps for Consumer Apps*, *EETimes Online* (Jun. 11, 2004).

*Touchsense® Programmable Rotary Modules*, Immersion Corporation (2004).

*Xerox Copier Assistant™*, www.xerox.com. (Aug. 24, 2005).

S.J. Lederman and R.L. Klatzky, *Hand Movements: A Window Into Haptic Object Recognition, Cognitive Psychology*, 19(3), pp. 342-368 (1987).

\* cited by examiner

IMAGING SYSTEM WITH HAPTIC INTERFACE

BACKGROUND

The present exemplary embodiment relates generally to an imaging system, such as a printer, fax, or copy machine, and in particular to a haptic interface for a user to input commands to the imaging system.

Imaging systems, such as printers, copiers, fax machines, and multifunction devices incorporating two or more of these functions are becoming increasingly complex as they offer more functionality. In some of these devices, an operator selects from a menu using a touch-screen or keyboard. The menu is often displayed on a screen, with the display varying when the user selects a different mode. Operating such devices requires a significant amount of manual dexterity and visual acuity. This can limit accessibility to such devices by those who are either physically or visually impaired or blind. Learning to use such devices is often time consuming for all users. Additionally, designing keyboards for such systems becomes increasingly challenging as the space available for the keys is often limited.

CROSS REFERENCE TO RELATED PATENTS AND APPLICATIONS

U.S. Provisional Application Ser. No. 60/657,584, filed Mar. 1, 2005, entitled "BI-DIRECTIONAL REMOTE VISUALIZATION FOR SUPPORTING COLLABORATIVE MACHINE TROUBLESHOOTING," by Stefania Castellani, et al. is incorporated herein in its entirety, by reference. The application discloses a communication system for a xerographic imaging system for enhanced collaborative communication between a machine user and a remote troubleshooting advisor. A selected virtual representation is synchronously displayed to the user and the advisor via respective imagers. The advisor adjusts the virtual representation to suggest a section of the area of the machine wherein action by the machine user may resolve the troubleshooting need. Visual indicators may direct the user to a particular location and percussion centers on the machine identify a particular tapping location by the user to verify position identification to the advisor.

INCORPORATION BY REFERENCE

The following references, the disclosures of which are incorporated herein by reference in their entireties, are mentioned:

U.S. Pat. No. 6,636,197, issued Oct. 21, 2003, entitled "HAPTIC FEEDBACK EFFECTS FOR CONTROL, KNOBS AND OTHER INTERFACE DEVICES," by Goldberg, et al. discloses a method for providing a scrolling list for use with a haptic feedback device.

U.S. Pat. No. 6,838,851, issued Jan. 4, 2005, entitled "INNER-FORCE PROVIDING INPUT DEVICE HAVING A POWER-OPERATED ACTUATOR FOR GENERATING A CLICK FEEL," by Satoshi Hayasaka, discloses an inner-force providing input device adapted to generate a click feel on a manually operated rotary knob.

U.S. Pat. No. 5,734,373, issued Mar. 31, 1998, entitled "METHOD AND APPARATUS FOR CONTROLLING FORCE FEEDBACK INTERFACE SYSTEMS UTILIZING A HOST COMPUTER," by Rosenberg, et al., discloses an interface device for use with a host computer displaying a graphical environment comprising an actuator coupled to a user manipulatable object for providing a force resistance to motion of the user manipulatable object in response to commands from the host computer and in coordination with the graphical environment.

BRIEF DESCRIPTION

Aspects of the exemplary embodiment relate to an imaging system and method of imaging. In one aspect, the imaging system includes a processing component which receives images to be rendered, a rendering device in communication with the processing component for rendering an image supplied by the processing component, and a haptic interface in communication with the processing component for inputting commands from the user to the processing component for rendering the image, and outputting feedback from the processing component to the user as a force feedback.

In another aspect, an imaging method includes supplying an image to be rendered to an processing component and inputting a user selected command for rendering the image with a haptic interface. The haptic interface is in communication with the processing component. The method further includes outputting feedback from the processing component to the user as a force feedback to the haptic interface. The force feedback includes a force indicative of the user selected command. The image is rendered with a rendering device in communication with the processing component in accordance with the user selected command.

In another aspect, an imaging system includes an image input device, an processing component which receives images to be rendered from the image input device, a marking device for rendering the images on a print medium, and a haptic interface in communication with the processing component which inputs user selected commands to the processing component for rendering the image, and outputs feedback from the processing component to the user as a force feedback.

DETAILED DESCRIPTION

Aspects of the exemplary embodiment relate to a haptic interface for an imaging system and to a method of operating an imaging system using a haptic interface for selection of commands. The imaging system can include a printer and/or copier or can be a multifunction device which additionally includes a fax machine and/or email system and may include a scanner, or be another multifunction machine with fewer or more capabilities. The haptic interface supplies a position input to the imaging system and is configured for providing a user of the imaging system with force or tactile feedback, which is collectively referred to herein as "haptic feedback." In one aspect of the exemplary embodiment, the haptic interface includes a manipulable member in the form of a control knob. In use, the haptic interface provides physical sensations to the user manipulating the knob. The user can correlate the sensations with corresponding changes in the selection of functions and settings of the imaging system. In aspects of the exemplary embodiment, an actuator is coupled to the control knob and is connected to a processing component, such as a microprocessor. The microprocessor receives knob position and direction signals from a knob sensor. The microprocessor also sends appropriate force feedback control signals to the actuator so that the actuator provides forces on the knob. In this manner, a variety of programmable feel sensations can be output on the knob, such as vibrations, spring forces, clicks, torque fluctuations (hill forces), pulses, damping, or combinations thereof. Other examples of the types of force feedback that can be provided and how the forces can be generated are described, for example, in U.S. Pat. Nos. 5,734,373, 6,147,674, 6,154,201, 6,128,006, 6,636,197, and 6,838,851, all of which are incorporated herein by reference in their entireties. The microprocessor may be a part of a central processor of the imaging system or separate therefrom.

While the haptic interface is described herein with particular reference to a control knob, other manipulable members, such as joysticks, mouse controllers, and haptic pens (typically devices which are used in combination with a touch screen) are also contemplated.

The haptic interface allows improved accessibility to functions of the imaging system, such as marking (printing and/or copying), scanning, faxing, and emailing documents, particularly to visually impaired and blind users. The haptic interface can provide an alternative or addition to a conventional touch-screen user interface. In one aspect, a trained user may distinguish the modes and settings selected without reference to a screen or other visual or audible indicator. In another aspect, a screen and/or audible indicator allows a user to verify the selection being made or to provide feedback when a user has made a selection which is not accepted. The haptic interface may be used to simplify copying jobs with easily used and easily programmed features. It can reduce the learning curve for new users. Once a user is familiar with the operations of the haptic interface, such as rotation, depression, and the like, this knowledge is readily transferable to the control of other imaging systems with haptic interfaces. The compact design of the haptic interface enables the size of the control panel on an imaging system to be reduced. The interface can be used in a variety of different imaging systems having different functionality by modifications to the software, without the need to modify the physical design of the haptic interface. Additional functions can be programmed into an imaging system without the need to modify the physical layout of the control panel. Once the user is familiar with the interface, tasks may be performed faster and more precisely than when relying solely on visual feedback.

Figure 1:
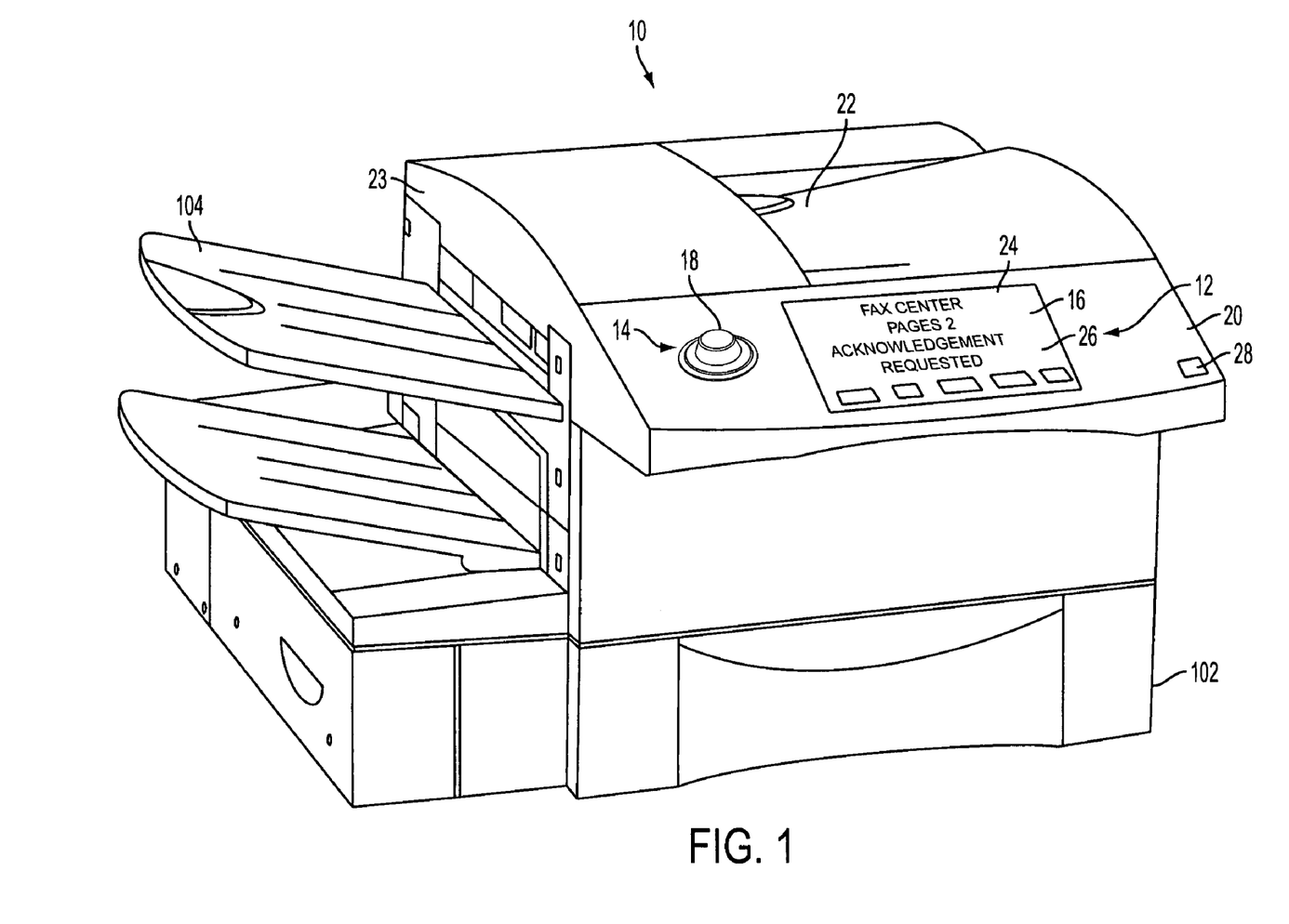
FIG. 1 is a perspective view of an imaging system in accordance with one aspect of the exemplary embodiment.
Figure 2:
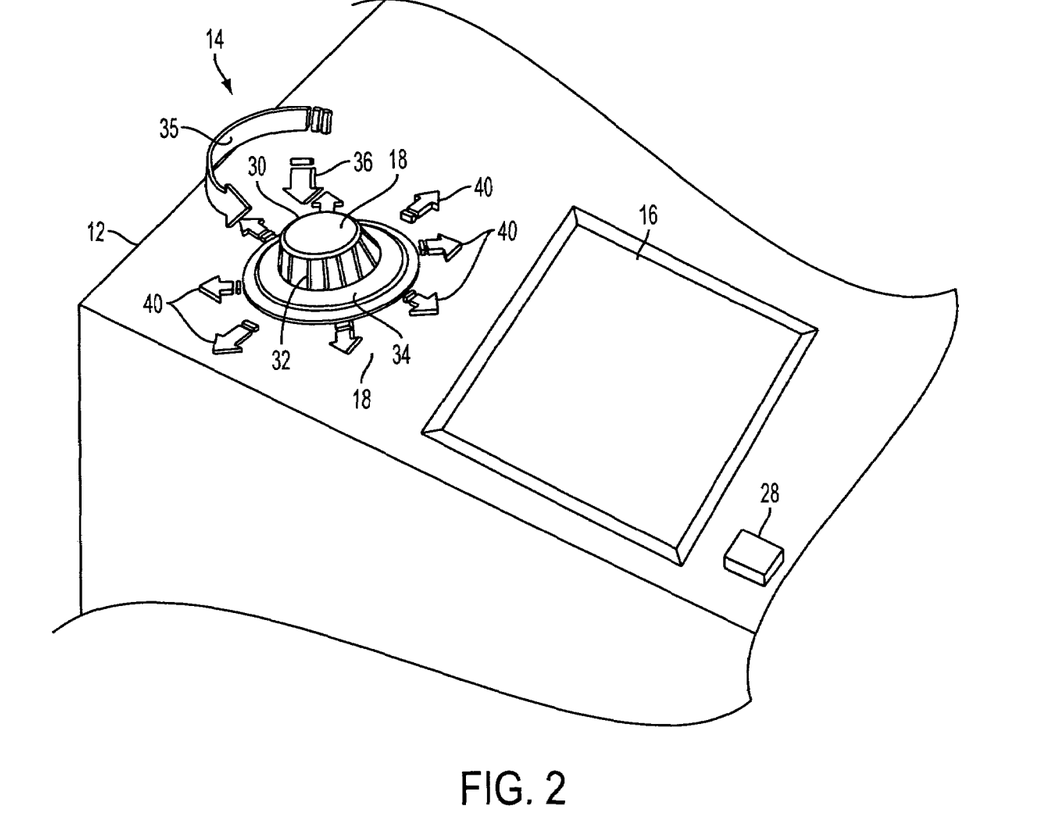
FIG. 2 is an enlarged perspective view of the haptic interface and screen of the imaging system of FIG. 1.

With reference to FIGS. 1 and 2, an imaging system 10, such as a printer, copier, fax machine, or multifunction device, such as a combined printer and copier or a combined printer/copier/fax machine is shown. The system 10 includes a control panel 12 including a haptic interface 14 and a display screen 16. In the illustrated embodiment, the haptic interface 14 includes a manipulable member 18 in the form of a control knob, which is mounted such that it protrudes from an accessible external panel 20 which forms an upper surface of a housing of the imaging system. The control panel 12 may be conveniently located adjacent a document feed 22 of a document scanning device 23.

The control knob 18 is manipulated by the user to control various functions of the imaging system 10. In the exemplary embodiment, the haptic interface, through manipulation of the knob 18, is used to select a mode of the imaging system from a plurality of modes, such as selection between copying, faxing, and email modes. Within each mode, the haptic interface may be used to select various functions specific to that mode. For example, in the case of a copying mode, the knob 18 may be manipulated to select one or more of: paper properties, such as paper size (e.g., a selection from letter size and A4 paper) and paper quality (e.g., a selection from copy paper, bond paper, headed or colored paper, and the like); image properties, such as brightness, color; enlargements or reductions in image size; and number of copies. Within the fax mode, the user may select one or more of: entering a fax number and whether an acknowledgement of receipt of the fax is requested. Within the faxing mode, the user may select one or more of: entering an email address, sender notification of receipt, and number of copies. A wide variety of other functions may also be provided by the haptic interface 14.

Unlike purely mechanical switches, encoders, and other control devices, the haptic interface 14 provides a two-way channel of communication between the user and the processing component or components of the imaging system. The mechanical movements of the haptic interface 14 applied by the user are converted to electrical signals which are used by the imaging system 10 in controlling the selected functions.

The illustrated display 16 is coupled to the haptic interface 14 and located adjacent thereto. The display 16 shows information to the user regarding the imaging system and the functions available for selection. For example, modes 24 can be displayed to indicate which modes of the device are available or are currently selected and being adjusted through manipulation of the knob 18. Such modes 24 can include "fax," "copy," "email," and the like. Information related to additional functionality of the device can also be displayed, such as a list of items from which the user can select by manipulating the control knob 14. Thus, selection of one mode can lead to a menu of sub-modes 26, corresponding to the various function options available within the mode. In turn, each of the functions may have further selectable options, such as settings for the functions, and so forth. It will be appreciated that the number and arrangement of levels may vary, depending on the number of modes and functions to be accommodated. In the illustrated embodiment, the haptic interface 14 controls all of the user selectable functions of the imaging system 10, except for the power, which is controlled with an on-off switch 28. In some embodiments, however, conventional buttons, knobs or the like may be used to control some of the user-selectable modes and functions of the imaging system or to provide an alternative method for controlling some or all of the modes and functions which are also controllable by the control knob 14.

The display 16 can be any suitable display device, such as an LED display, LCD display, gas plasma display, CRT, or other device. In some embodiments, display 16 can include a touch-sensitive surface to allow a user to "touch" displayed images directly on the surface of the display 16 to select those images and an associated setting or function.

In FIG. 2, the manipulable member 18 is illustrated as comprising a generally cylindrical button with an upper surface 30, a knurled circumferential surface 32 depending therefrom, and a peripheral plate 34 extending radially from the lower end of the circumferential surface. The member 18 allows the user to manipulate the haptic interface 14 with the palm of the hand or fingertips in order to manipulate functions and settings of the imaging system 10. The member 18 may have a variety of different textures on its surface 32, including bumps, lines, or other grips, or projections extending therefrom. Other suitable manipulable objects which are engageable by the user are also contemplated, such as those having conical shapes, spherical shapes, dials, cubical shapes, rods, and the like. Exemplary control knobs are described, for example, in U.S. Pat. Nos. 6,636,197, 6,838,851, and 5,734,373, incorporated herein by reference. Additionally, for particular users, the member 18 may be located and/or configured for manipulation with another part of the user's body, such as the foot or arm.

The illustrated member 18 rotates in a single rotary degree of freedom about an axis extending out of the knob, as shown by arrow 35. The user may grip or otherwise contact the circumferential surface 32 of the member 18 to rotate it a desired amount. The member 18 may further be moved in an axial direction as indicated by arrow 36 by pressing on the upper surface 30 of the member and optionally also in one or more transverse" or "lateral" motions in directions in a plane perpendicular to the axis, as indicated by arrows 40, by pressure on the appropriate portion of the circumferential surface 32. The knob 18 may be spring loaded such that once the user releases or stops exerting sufficient force on the knob, the knob returns to a centered rest position.

Figure 3:
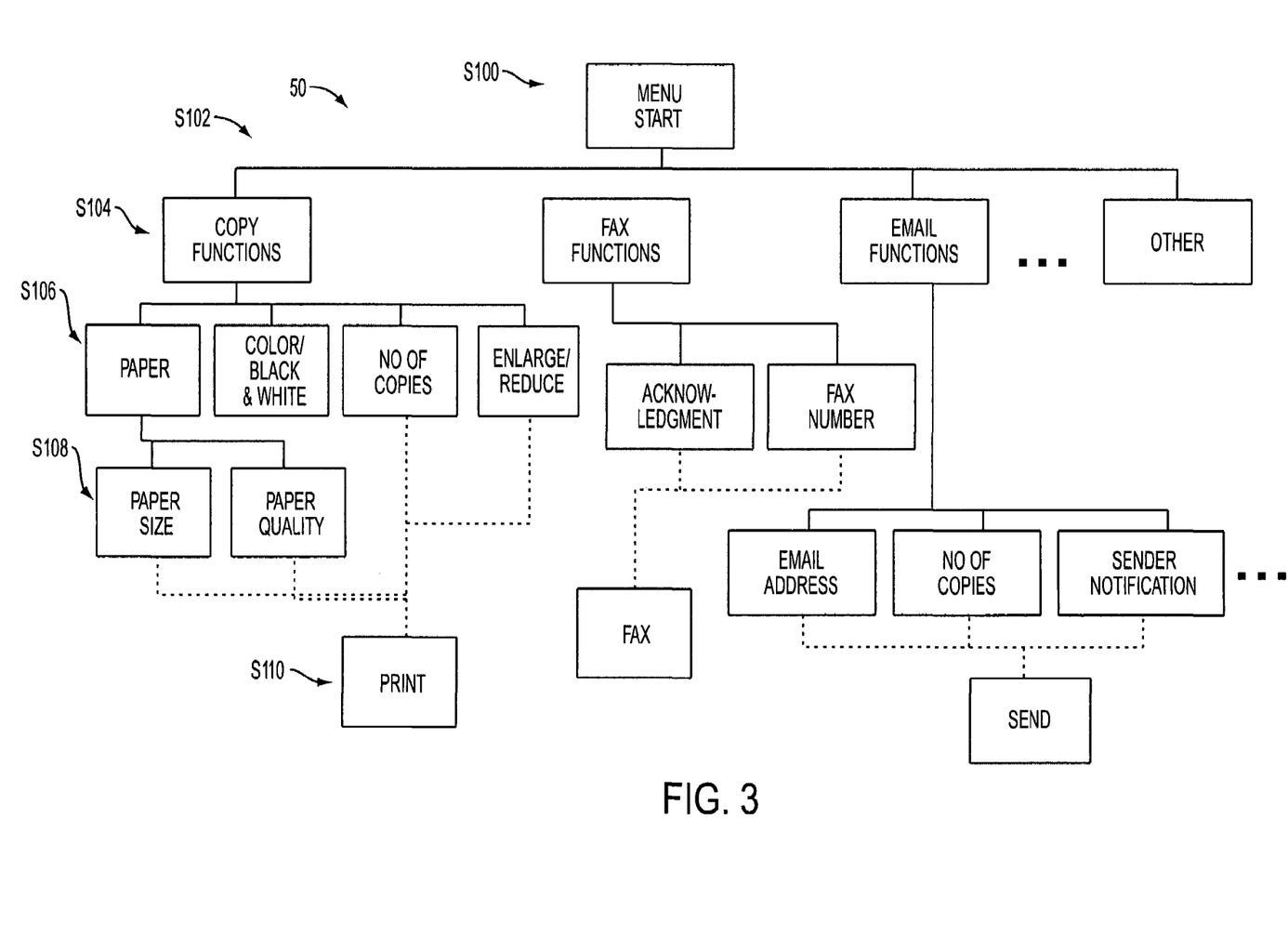
FIG. 3 is an assembly tree of exemplary selectable modes for the haptic imaging system of FIG. 1.

An example of a menu tree 50 which is accessible via manipulation of the interface 14 is shown in simplified form in FIG. 3. The menu tree is accessed through defined actuations of the haptic interface 14. The menu options may be displayed on the screen 16 and change as the user progresses through the menu tree 50. For example, proceeding from menu start (step S100) a user rotates the knob 14 to select from copy, fax, and email modes, and optionally other modes (step S102). Each of the modes may be associated with force feedback, e.g., in the form of a click or other sensation. For example, rotation of the knob 14 until a first click is sensed indicates to the user that the knob is in a position where copy functions can be selected. Rotation of the knob until a second click is sensed indicates that the knob is in the position where fax functions are selected, and so forth. The user selects the mode, for example, by pushing the knob in the direction of arrow 36 (Step S104). The sensation of hitting a hard stop may be provided to indicate the end of a list. Once a mode has been selected in this way, the screen 16 changes to indicate further options which are available within the selected mode. For example, if the user has selected the copy mode, the user may rotate then depress the knob 14 to select from paper, color or black and white printing, number of copies, and enlarge/reduce functions (step S106). Each of these sub-modes may have further modes, such as paper size, paper quality, and so forth, selectable in a similar manner (step S108).

To allow a user to distinguish between the modes and/or submodes, the feedback sensations may be different. For example, when a user is in the copy mode, the available sub-modes may be identifiable by a hill force effect where the sensed force on rotation increases to a maximum then decreases again. The change from increasing to decreasing force indicates the transition to a new menu. The first peak may indicate that a paper options submode can now be entered by depression of the knob, the color/black printing submode corresponding to the second peak, and so forth. Different types of hill effects may be provided, from a sharp peak to a plateau. When the user is in the fax mode, a different set of feedback sensations may be provided when the knob is rotated, such as periodic vibrations, e.g., as sine, square, or triangular waves, lasting for a set period of time. Another type of sensation may be provided when the user is in the email mode, and so forth. Combinations of force feedback effects may be used to extend the range of available feedback sensations for the modes and submodes. A sensation of roughness may be used to communicate the feel of a surface that will be associated with the navigation within a particular mode. It can also be used to indicate a path which is recommended in the menu, such as a default setting. A direction of a force or rate of increase or decrease may be used to indicate a preferred path.

To return to a higher level in the menu tree, a user may press the member 18, or perform another predefined mode shifting operation. Once a user has selected all desired options, at step S110, the user selects print, by performing a predefined operation on the haptic interface knob 18, such as with a lateral motion by pressing the knob in the direction of one of arrows 40.

In one aspect, the haptic interface 14 converts inputs in a non linear or dynamic fashion. In this way, for example, angular rotation of the control knob allows fine control and coarse control within a mode, depending on the angular position of the control knob. Where the available options are of a limited number, such as from two to five, rotation of the knob 18 by a certain angle and associated feedback may be sufficient for the user to distinguish between modes/sub-modes without the need to refer to the screen. Where there are a greater number of options, other methods of selection may be provided such as non-linear options. For example, when the user is in the number of copies mode, rotation at a different speed, e.g., a higher speed, may be used to shift from a mode in which a small number of copies is selected, such as one to five, to a mode where higher numbers can be selected. For example, a user may rotate the knob slowly to select from 1-5 copies, with associated feedback in the form of clicks or other sensations. The user may rotate the knob at a faster speed to select 6-10 copies on the first click, 11-20 copies on the second click, and so forth. The user then slows the rotation speed to select from 6, 7, 8, 9, or 10 copes, and so forth.

Figure 4:
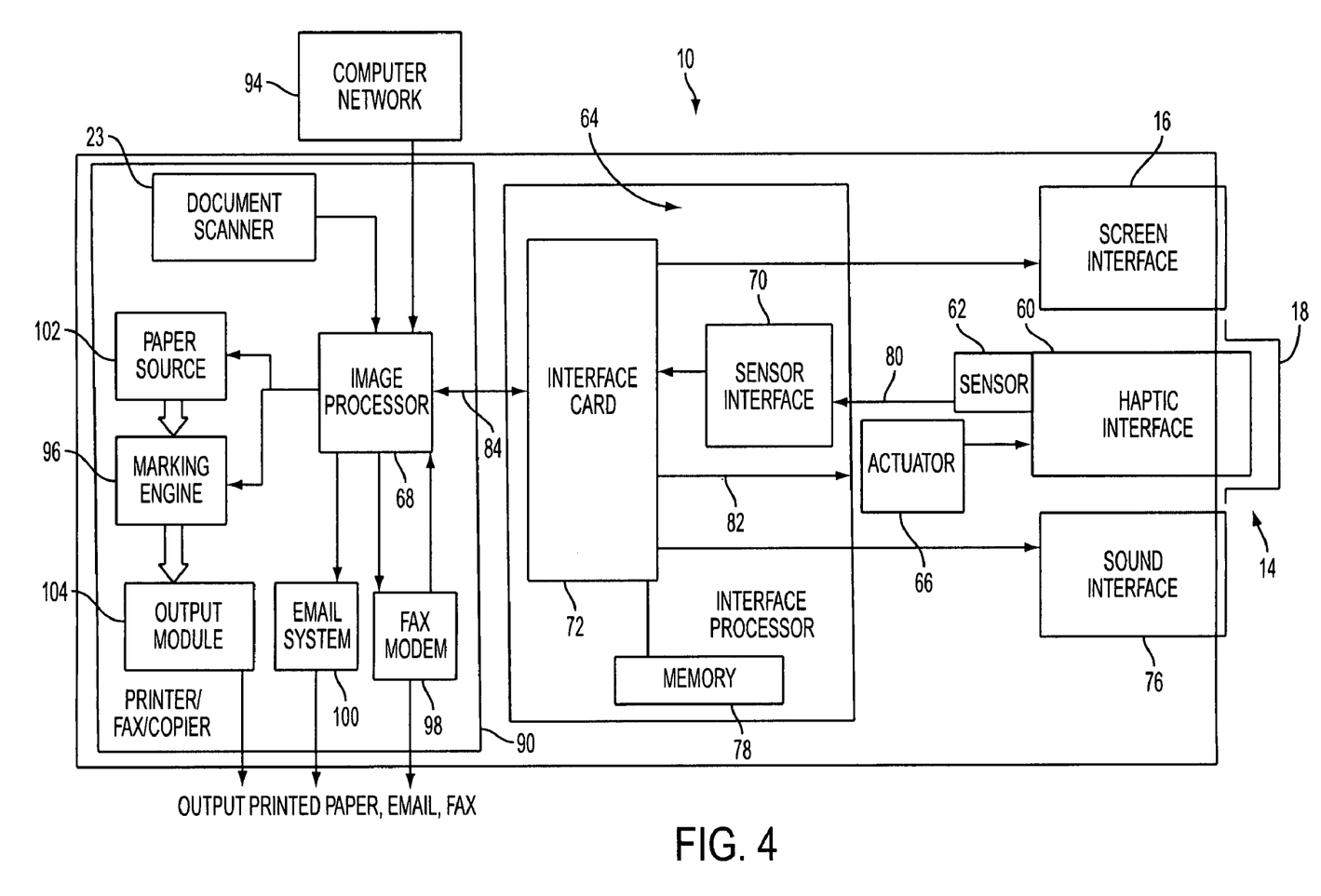
FIG. 4 is a block diagram of an imaging system which incorporates a control system suitable for use with the haptic interface of FIG. 1.

As illustrated in FIG. 4, the haptic interface 14 includes a support mechanism 60, which responds to movements of the manipulable member 18. The mechanism 60 can include some or all of the components needed for rotational motion, transverse motion, and the push and/or pull motion of the member 18, and haptic feedback in any or all of these degrees of freedom of the member. The support mechanism 60 supports the member 18 with respect to an origin while allowing a plurality of degrees of freedom in the motion of the member 18 with respect to the origin. An example of such a mechanism 60 is shown in FIG. 2 of U.S. Pat. No. 6,636,197, incorporated herein by reference. It will be appreciated, however, that the support mechanism 60 is not limited to such a configuration.

Sensors 62 associated with the mechanism 60 sense the position, motion, and/or other characteristics of knob 18 along one or more degrees of freedom and provide signals, including information representative of those characteristics, to a processing component of the imaging system, which in the illustrated embodiment includes an interface processor 64 and an image processor 68. The sensors 62 may be digital sensors, mechanical sensors, or optical sensors. Examples of suitable sensors include optical encoders, analog sensors such as potentiometers, Hall effect magnetic sensors, optical sensors such as a lateral effect photo diodes, tachometers, and accelerometers. Furthermore, both absolute and relative sensors may be used. Typically, a sensor is provided for each degree of freedom along which member 18 can be moved, or, a single compound sensor can be used for multiple degrees of freedom.

One or more actuators 66 are coupled with the haptic interface 14 for providing a force resistance to motion of the member 18 along one or more of the degrees of freedom to provide the clicks or other force feedbacks. The actuators 66 may be motors or other force applying devices which act on the member 18 directly, or indirectly, through the mechanism 60. Actuator 66 can be an active actuator, such as a linear current control motor, stepper motor, pneumatic/hydraulic active actuator, a torquer (motor with limited angular range), voice coil actuator, etc. Passive actuators can also be used, including magnetic particle brakes, friction brakes, or pneumatic/hydraulic passive actuators, and generate a damping resistance or friction in a degree of motion. A drive mechanism (not shown), such as a belt drive, gear drive, or capstan drive mechanism, can be used to provide mechanical advantage to the forces output by the actuator 66.

The sensors 62 of the mechanism 60 communicate with the interface processor 64. The interface processor may serve as an interface between the haptic interface 14 and the image processing component 68 of the imaging system. Although the processors 64 and 68 are illustrated as separate components, a central processing component may alternatively incorporate the functions of the interface processor 64 and the image processor 68. Alternatively, the processing component 64, 68 of the system may be distributed throughout the system. The illustrated interface processor 64 includes an optional sensor interface 70 and an interface card 72. The sensor interface 70 receives the sensed signals from the mechanism sensors 62 and converts these to signals corresponding to positions or movements of the haptic interface. The interface card 72 converts these signals into commands understood by the image processor 68, such as a command to use plain paper and a color marking engine for the associated copy job. The interface card 72 may be an interchangeable processing component which is configured to provide those commands capable of being performed by the imaging system 10 in a machine readable format comprehended by the image processor 68. In this way, other components of the haptic interface 14 and the interface processor 72 may be common to corresponding components used in a variety of different imaging systems to which the haptic interface is applicable. The interface card 72 communicates with the screen 16 to display the commands as they are received and the next set of selectable options. The interface card 72 also communicates with the actuators 66 to provide force feedback to the user corresponding to the selected command. In the illustrated embodiment, the actuators 66 act on the mechanical support 60 although it is also contemplated that the actuators may act directly on the member 18.

The interface card 72 may receive and decode commands from the image processor 68. For example, if the imaging system 10 has run out of a particular type of paper, which a user has selected via the haptic interface 14, the image processor 68 signals this as a command to the interface card 72 which may provide force feedback, for example, in the form of a vibration of the member 18, to alert the user that the selection has not been accepted. The interface card 72 may also communicate with the screen 16 so that a visible message is displayed on the screen describing the problem with the user's selection and suggesting alternatives, such as ADD PAPER or SELECT ALTERNATIVE PAPER. In the case of the email or fax mode, a vibration or other force feedback may be used to alert the user that the fax or email is not going through to the recipient.

For visually impaired users, an audio output from a sound interface 76 coupled to the interface processor 64 may be used in addition to or in place of the screen 16 to provide audible messages to supplement or reinforce the force feedback.

The interface processor 72 may include a memory 78, which stores a plurality of command routines. A particular one of the command routines is executed in response to a particular command received from the image processor 68. The command routines may include a force routine that causes the actuator 66 and/or mechanism 60 to produce a resistance to motion of the member 18 along one or more of its available degrees of freedom.

Other input devices (not shown) can be included to send input signals to the interface processor 64. Such input devices can include buttons or other controls used to supplement the input from the panel 12 to the controlled imaging system. Also, dials, switches, voice recognition hardware (e.g. a microphone, with software implemented by the interface processor), or other input mechanisms, can also be included to provide input to the interface processor 64 or to the actuator 66. A deadman switch (not shown) can be included on or near the member 18 to cause forces to cease outputting when the user is not contacting the member, e.g., to prevent the member 18 from spinning on its own when the user is not touching it. Contact of a user's digit (finger, thumb, etc.) with the member can be detected, e.g., as pressure on the member 18.

Communications between the haptic interface 14 and the interface processor 64 and between the interface processor and the image processor 68 can be via wired or wireless connections 80, 82, 84, respectively.

The imaging system 10 includes an imaging component 90, which includes the functional components of the imaging system 10, and may also include the image processor 68. The functional components can include an image input device, such as scanner 23 and/or connection to a computer network 94 or single computer through which images to be rendered (printed, copied, faxed or emailed) are received. The image processor 68 uses conventional processing systems for converting the scanned or otherwise input image into a form which can be output by a rendering device, such as a marking engine 96 (for printing/copying), a fax modem 98 for outputting as a fax, or an email processing system 100 connected to an internet provider network for sending out as an email. The printing, copying, faxing, or email functions are performed in accordance with user commands provided via the haptic interface 14. The illustrated imaging component 90 also includes a print media source 102, which supplies paper, or other sheet material to be marked, to the marking engine 96. The paper source 102 may include a number of trays, each including a different type of print media, such as copy paper, bond paper, headed paper, and the like. In response to a user selection of one of these papertypes for a printjob, the image processor 68 instructs the paper source 102 to supply the selected print media to the marking engine 96. The marking engine 96 applies an image to the print media and fixes it thereto. The marking engine 96 may be a xerographic marking engine, inkjet printer, thermal printer or the like. Two or more marking engines 96 may be provided, e.g., one for color marking and one for monochrome (black) marking. An output module 104, such as a paper tray or other finishing device, such as a stapler, binder, or the like, outputs the finished document. A conveyor system conveys the paper between the paper source, the marking engine and the output module.

Imaging systems having multiple functionalities, such as fax, email, and print capabilities, and which may be utilized with the exemplary haptic interface 14 are described, for example, in U.S. Pat. No. 5,872,569, entitled "APPARATUS AND METHOD FOR PROGRAMMING AND/OR CONTROLLING OUTPUT OF A JOB IN A DOCUMENT PROCESSING SYSTEM," by Salgado, et al., U.S. Pat. No. 6,438,574, entitled "MULTIFUNCTIONAL APPARATUS AND DATA PROCESSING METHOD," by Nagashima, and U.S. Published Patent Application No. 2005/0138065, entitled "SYSTEM AND METHOD FOR PROVIDING DOCU- MENT SERVICES," by Ciriza, which are incorporated herein in their entireties, by reference.

In addition to being used for controlling the normal operation of the imaging system, the haptic interface may be used in troubleshooting when a failure of the imaging system occurs. Through a link, such as a telephone line or wireless connection to a remotely located expert, the haptic interface may be used to identify problems with the imaging system and to provide feedback to the user in effecting a repair or maintenance of the imaging system. For example, the user may use the haptic interface to select, from a menu tree, the nature of the problem or where the problem is perceived to be occurring. The expert has a suitable processing component, such a computer, which is linked by the telephone line or other data transfer link to the interface processor 64 of the imaging system and thereby provides feedback to the user in the form of force and/or other feedback to assist in a repair, removal of a part (the force feedback could be used in demonstrating how much force to use in removing a part), or other action to be taken.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An imaging system comprising:
a processing component which receives images to be rendered;
a rendering device in communication with the processing component for rendering an image supplied by the processing component;
a haptic interface in communication with the processing component for inputting commands from the user to the processing component for rendering the image, and outputting feedback from the processing component to the user as a force feedback, the processing component being linked to a second processing component at a remote location, whereby an expert provides feedback to assist a user in troubleshooting a problem with the rendering device, the feedback being provided to the haptic interface as a force feedback.

2. The imaging system of claim 1, wherein the rendering device includes at least one of the group consisting of a marking engine, a fax modem, and an email processing component connected to the internet.

3. The imaging system of claim 2, wherein the rendering device includes at least one marking engine which is configured for rendering the image by applying a marking material to print media.

4. The imaging system of claim 3, further comprising a source of print media which supplies a selected one of a plurality of print media types to the marking engine in response to a user command input to the haptic interface.

5. The imaging system of claim 1, wherein the processing component comprises an interface processor and an image processing component, the interface processor converting signals from the haptic interface into a form recognizable by the image processor.

6. The imaging system of claim 5, further comprising a source of digital images in communication with the image processing component which supplies an image to be rendered to the image processing component.

7. The imaging system of claim 1, wherein the haptic interface comprises a manipulable member and a sensor configured to detect a motion of the manipulable member and output a sensor signal associated with the motion of the manipulable member.

8. The imaging system of claim 7, wherein the haptic interface comprises an actuator in communication with the processing component, the actuator being coupled to the manipulable member for providing the force feedback.

9. The imaging system of claim 7, wherein the rendering device includes a marking engine, a fax modem, and an email processing component and the manipulable member is movable in at least one predetermined pattern for selection between marking, email, and fax functions, the force feedback varying according to which of the functions is selected.

10. The imaging system of claim 7, wherein the force feedback comprises at least one of the group consisting of vibrations, spring forces, clicks, torque fluctuations, pulses, and damping of the manipulable member.

11. The imaging system of claim 1, wherein the haptic interface accesses a menu of commands and the force feedback is indicative of a level of the menu being accessed.

12. An imaging method comprising:
supplying an image to be rendered to a processing component;
inputting a user selected command for rendering the image with a haptic interface, the haptic interface being in communication with the processing component;
outputting feedback from the processing component to the user as a force feedback to the haptic interface, the force feedback including a force indicative of the user selected command;
rendering the image with a rendering device in communication with the processing component in accordance with the user selected command, and
providing feedback from an expert at a remote location to assist a user in troubleshooting a problem with the rendering device, the feedback being provided to the haptic interface as a force feedback.

13. The imaging method of claim 12, wherein, when the paper properties submode is selected, manipulating the manipulable member to select from paper size and paper quality, when the image properties submode is selected, manipulating the manipulable member to select from brightness, color, and enlargements or reductions in image size.

14. The imaging method of claim 12, wherein the inputting of the user selected command includes manipulating the manipulable member.

15. The imaging method of claim 12, wherein the rendering includes applying a marking material to a print medium.

16. The imaging method of claim 12, wherein the outputting feedback further including a force to indicate that the rendering device is unable to perform the user selected command.

17. The imaging method of claim 12, wherein inputting the user selected command comprises manipulating the manipulable member to select from marking, email, and fax modes of the imaging system.

18. The imaging method of claim 12, wherein, when the marking mode is selected, manipulating the manipulable member to select from a plurality of sub modes comprising two or more of paper properties, image properties, and number of copies.

* * * * *